United States Patent

Schmidt et al.

[11] Patent Number: 5,940,774
[45] Date of Patent: Aug. 17, 1999

[54] CELL CONTROL SYSTEM FOR CELLULAR, DIGITAL MOBILE COMMUNICATION SYSTEM

[75] Inventors: Werner Schmidt, Boyle, United Kingdom; Peter Vary; Wolfgang Papen, both of Aachen, Germany; Stefan Zürbes, Herzogenrath, Germany

[73] Assignee: Detecon Deutsche Telepost Consulting GmbH, Germany

[21] Appl. No.: 08/656,217

[22] PCT Filed: Dec. 15, 1994

[86] PCT No.: PCT/EP94/04156

§ 371 Date: Oct. 8, 1996

§ 102(e) Date: Oct. 8, 1996

[87] PCT Pub. No.: WO95/17798

PCT Pub. Date: Jun. 29, 1995

[30] Foreign Application Priority Data

Dec. 21, 1993 [DE] Germany .................. 43 43 765

[51] Int. Cl.[6] .................................................. H04B 1/38
[52] U.S. Cl. ..................... 455/561; 455/69; 455/101; 455/137; 455/273; 455/507; 455/524; 375/347; 375/349
[58] Field of Search .................. 455/561, 524, 455/560, 562, 443–446, 101, 133–135, 137, 273, 522, 502, 503, 69, 507; 375/277.2, 267, 266, 347, 349

[56] References Cited

U.S. PATENT DOCUMENTS

| | | | |
|---|---|---|---|
| 4,450,585 | 5/1984 | Bell | 455/135 |
| 4,583,217 | 4/1986 | Kittel | 370/29 |
| 5,008,883 | 4/1991 | Eizenhöfer et al. | 370/95.1 |
| 5,088,108 | 2/1992 | Uddenfeldt et al. | 375/12 |
| 5,193,109 | 3/1993 | Lee | 455/562 |
| 5,239,698 | 8/1993 | Dejmek et al. | 455/137 |
| 5,345,598 | 9/1994 | Dent | 455/522 |
| 5,530,925 | 6/1996 | Ganner | 455/273 |
| 5,625,876 | 4/1997 | Gilhousen et al. | 455/561 |
| 5,644,599 | 7/1997 | Hess | 375/267 |

FOREIGN PATENT DOCUMENTS

4141398 1/1994 Germany .
1300634 12/1989 Japan .

*Primary Examiner*—Wellington Chin
*Assistant Examiner*—Lee Nguyen
*Attorney, Agent, or Firm*—Brown, Martin, Haller & McClain, LLP

[57] ABSTRACT

A control system for the radio coverage of a cellular digital mobile communication system by a process for the lighting of radio cells, in which the mobile station (MS) is supplied with the same signal from several base stations (BS) from the edge of the cell in the mutual broadcasting system via directional aerials. One cell controller (CC) is provided for the compound optimization of the cell parameters which contains the new functions for signal processing and the control of the radio devices determined by the radio cell lighting process used.

35 Claims, 5 Drawing Sheets

FIG. 1 PRIOR ART

MULTI SUPPORT OF A MOBILE STATION ON MS
THROUGH THREE FIXED STATIONS $BS_1$---$BS_3$

- ● MASTER BS WITH CONNECTION TO NEXT HIGHER UNIT
- ○ SLAVE BS
- ⎯ TRANSMITTING DISTANCE BETWEEN MASTER BS AND SLAVE BS

FIG. 6

CELL CONTROL SYSTEM FOR CELLULAR, DIGITAL MOBILE COMMUNICATION SYSTEM

BACKGROUND OF THE INVENTION

The present invention relates generally to control systems for cellular, digital mobile communication systems.

In DE-OS 41 41 398 A1 (U.S. patent application Ser. No. 08/807,962 of Schmidt et al.) a process is described for improving the radio cell illumination in a cellular mobile radio system and a device for carrying out the process described. However, in this document no information is given on how the equipment for carrying out this process should be constituted.

SUMMARY OF THE INVENTION

It is an object of the present invention to provide a new and improved control system for distribution of signals from a base station controller between the base stations of a cell and for combining the signals received by several base stations into an aggregate signal.

The solution presented here to the control of the sending and receiving equipment installed in the radio base stations, the processing of the signals coming from this, and the processing of the signals going to it is characterized in that a cell controller (CC) has been provided for grid optimization of the cell parameters, which contains the new functions for signal processing and for controlling the radio equipment required by the radio cell illumination process used.

It is important that the control equipment be so constituted that as many existing components of conventional realizations as possible can be used further.

Figure 1:
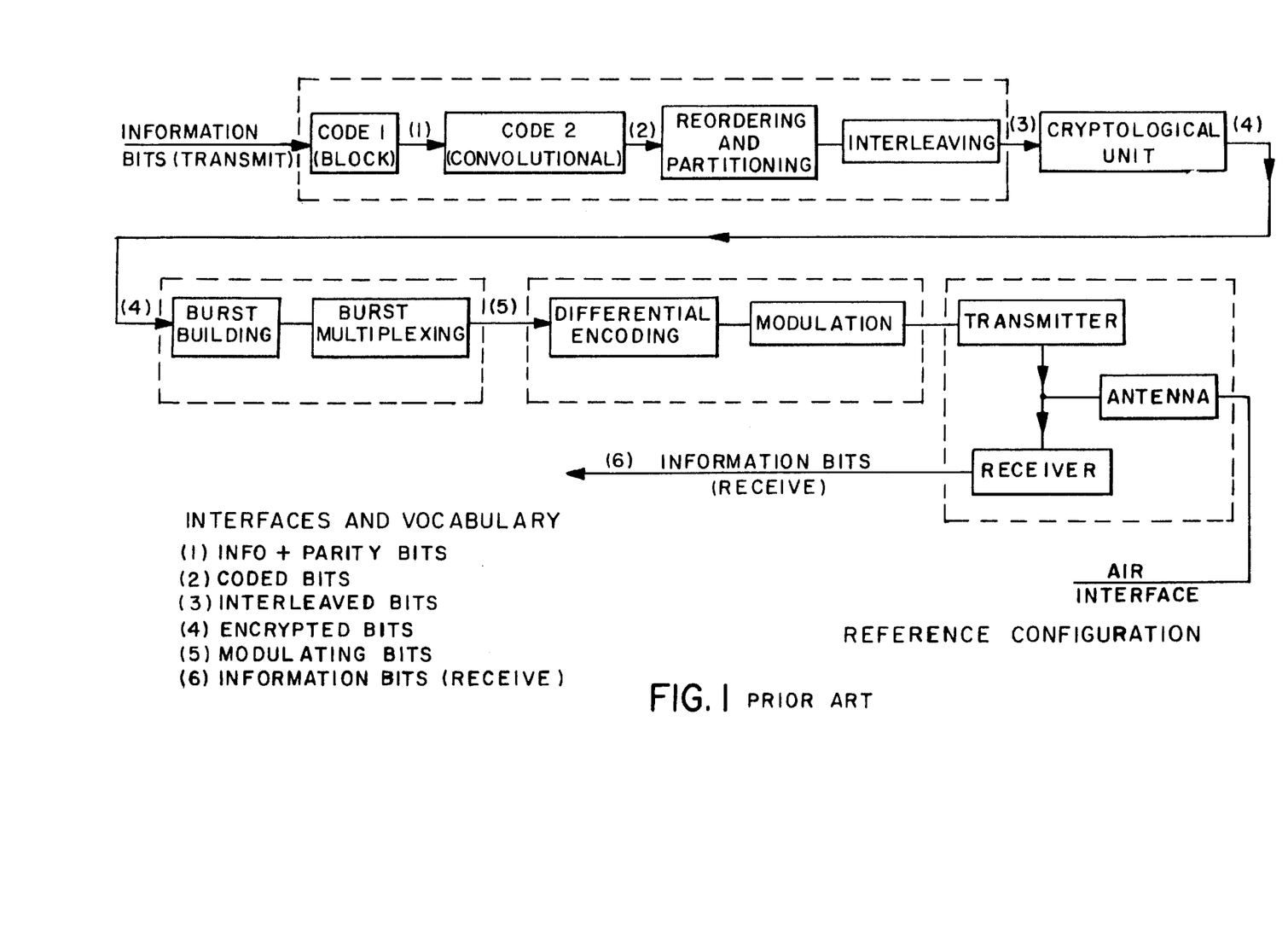
FIG. 1 shows a survey of the physical layer in the GSM system.

The equipment and functions will be described in the following using the GSM Standard for Mobile Communication as an example. The control installation described here is naturally not limited to this communication standard, but can be applied to all other cellular, digital mobile communication standards. The functions defined in the GSM Standard for radio transmission have been shown in FIG. 1, which is taken from GSM recommendation 05.01 (ETSI-GSM Technical Specification GSM 05.01. Physical Layer on the Radio Path: General Description. European Telecommunications Standards Institute, February 1992.)

The process according to DE-OS 41 41 398 A1 assumes that a cell is supplied not as previously by one transmitting and receiving installation but rather from several sides from the edge with the same signal in simultaneous broadcasting operation with directional antennas. With this concept with multiple communication in principle the same sites can be used as for conventional radio communication. In each base station several mutually overlapping sector antennas have been installed.

In the following the equipment and their functions are explained for the case in which each cell is simultaneously supplied by three base stations by sector antennas with an opening angle of 120 degrees, whereby the sector antennas of adjacent and mutually, partially overlapping cells overlap by 60 degrees.

However, the solutions presented can also be applied in the same way to other cases with a smaller or larger number of base stations per cell as well as other opening angles and overlap ranges.

Figure 2:
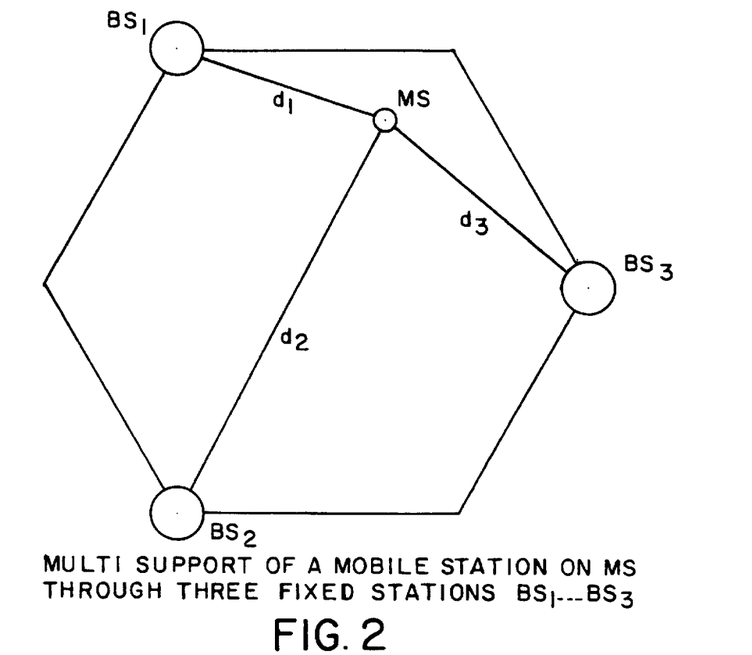
FIG. 2 shows the multiple communication to a mobile station MS through three base stations $BS_1$ to $BS_3$.

FIG. 2 illustrates the multiple communication of a mobile station MS with three base stations $BS_1$.. $BS_3$ per cell. It is seen that the mobile station MS is here connected to the three base stations through three different radio connection paths $d_1$.. $d_3$. In the downlink, that is, in the radio direction from the base station to the mobile station, the signals sent by the base station $BS_1$, are superimposed additively at the location of the mobile station MS. In the uplink, that is, in the radio direction from the mobile station to the base station, all three base stations BSi receive the signal sent by the mobile station MS. Because of the different connection paths with the respective distances $d_1$ to $d_3$, for the three paths different transmission times occur, which are essentially proportional to the respective distances $d_1$.. $d_3$. Over the three paths different propagation attenuations likewise occur, which to a first approximation are proportional to the $d_i$ ??, where ?? is the mean propagation coefficient.

Because of these multiple propagation paths with their under some circumstances, substantially different parameters, some substantial changes result as compared to a conventional net architecture with a simple communication. This pertains to, for example, the compensation for the different propagation times and the power regulation in the downlink and the uplink.

Figure 3:
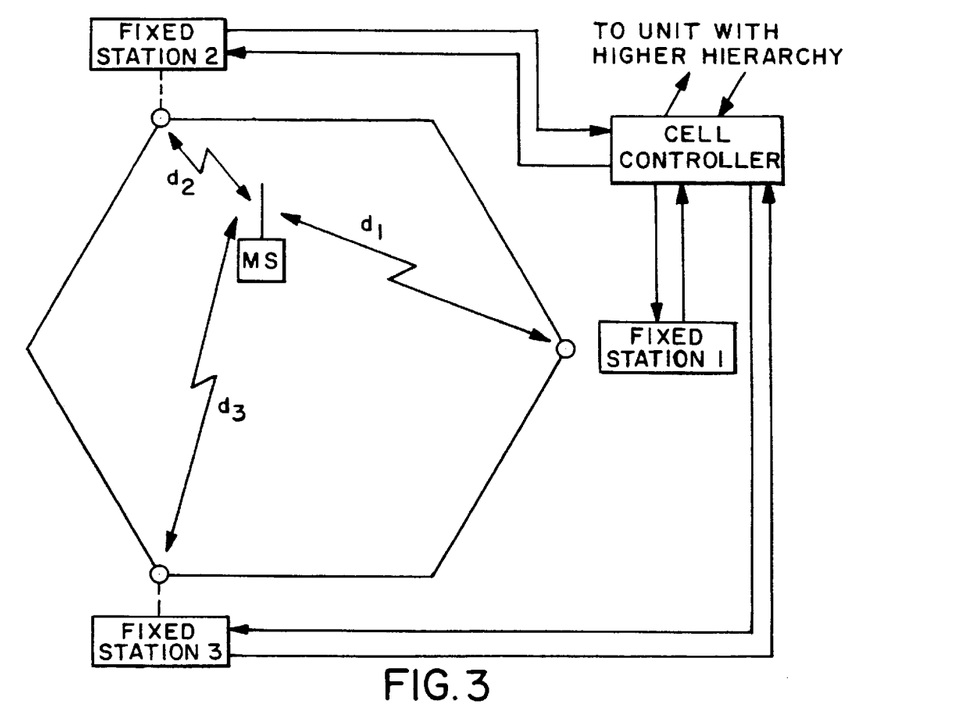
FIG. 3 shows the interaction of the cell controller and the base stations using three base stations per cell as an example.

Because these quantities must be determined individually for each cell and for each mobile station, the new cell controller system component carries out the necessary communication optimization of the cell parameters, which will be described in the next paragraphs. Furthermore, the cell controller is responsible for the combination of the different useful signals in the uplink and the distribution of the signals in the downlink. FIG. 3 illustrates the interaction of the cell controller and the base stations using three base stations per cell as an example.

The object of the invention for the present invention results not only from the object of the individual patent claims, but also from the combination of the individual patent claims with each other. All statements and features disclosed in the documentation, including the summary, especially the three-dimensional formation presented in the drawings, are claimed as essential to the invention to the extent that they individually or in combination are novel as compared to the state of the art.

BRIEF DESCRIPTION OF THE DRAWINGS

In the prior art following the invention is explained in more detail by means of drawings describing only one way of execution. Additional features and advantages essential to the invention here follow from the drawings and their description.

DESCRIPTION OF THE PREFERRED EMBODIMENT

FIGS. 2 to 6 illustrate a control system for a cellular mobile communication system according to a preferred embodiment of the invention.

Figure 4:
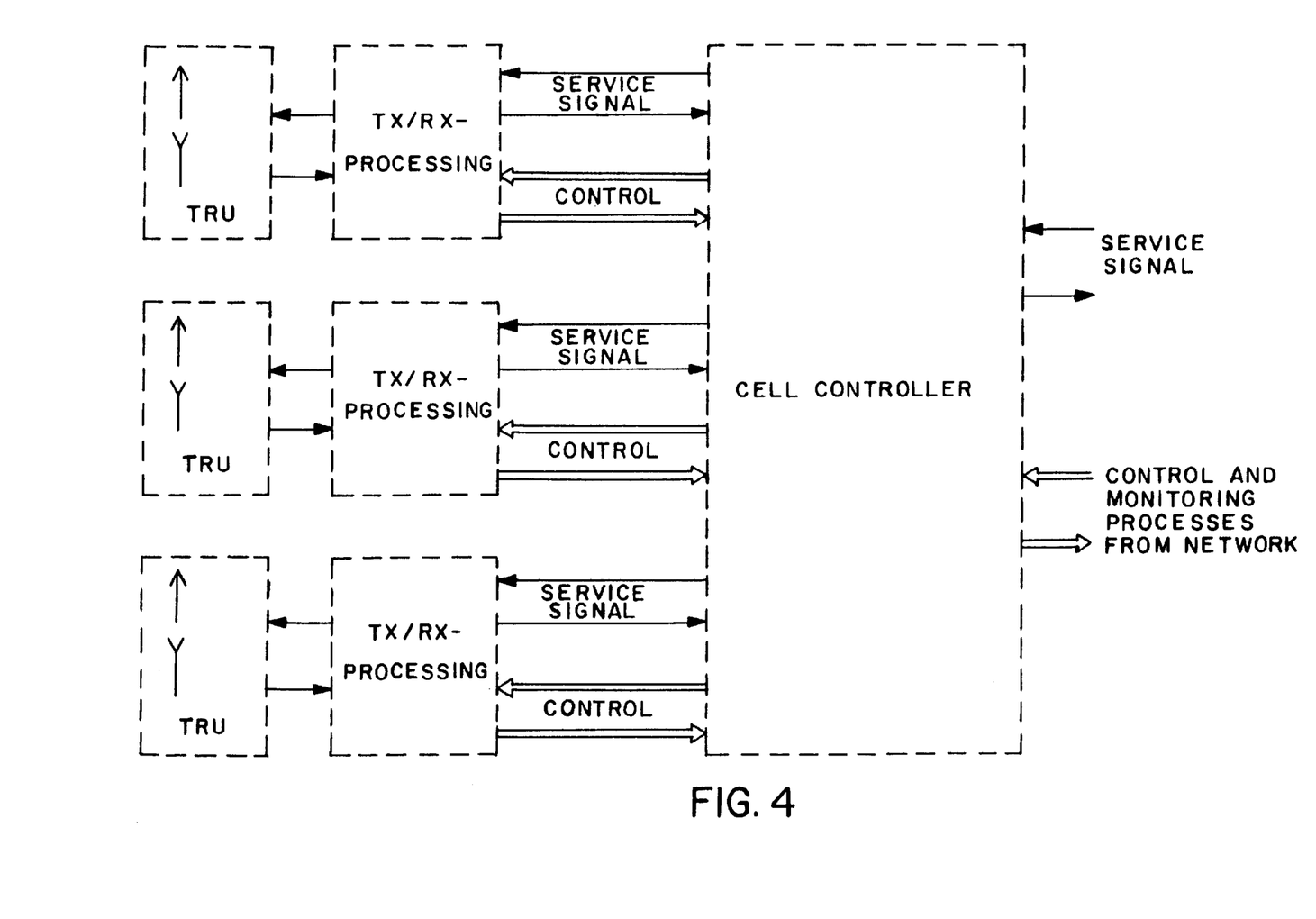
FIG. 4 shows a survey block diagram of the structure and the equipment of the invention.
Figure 5:
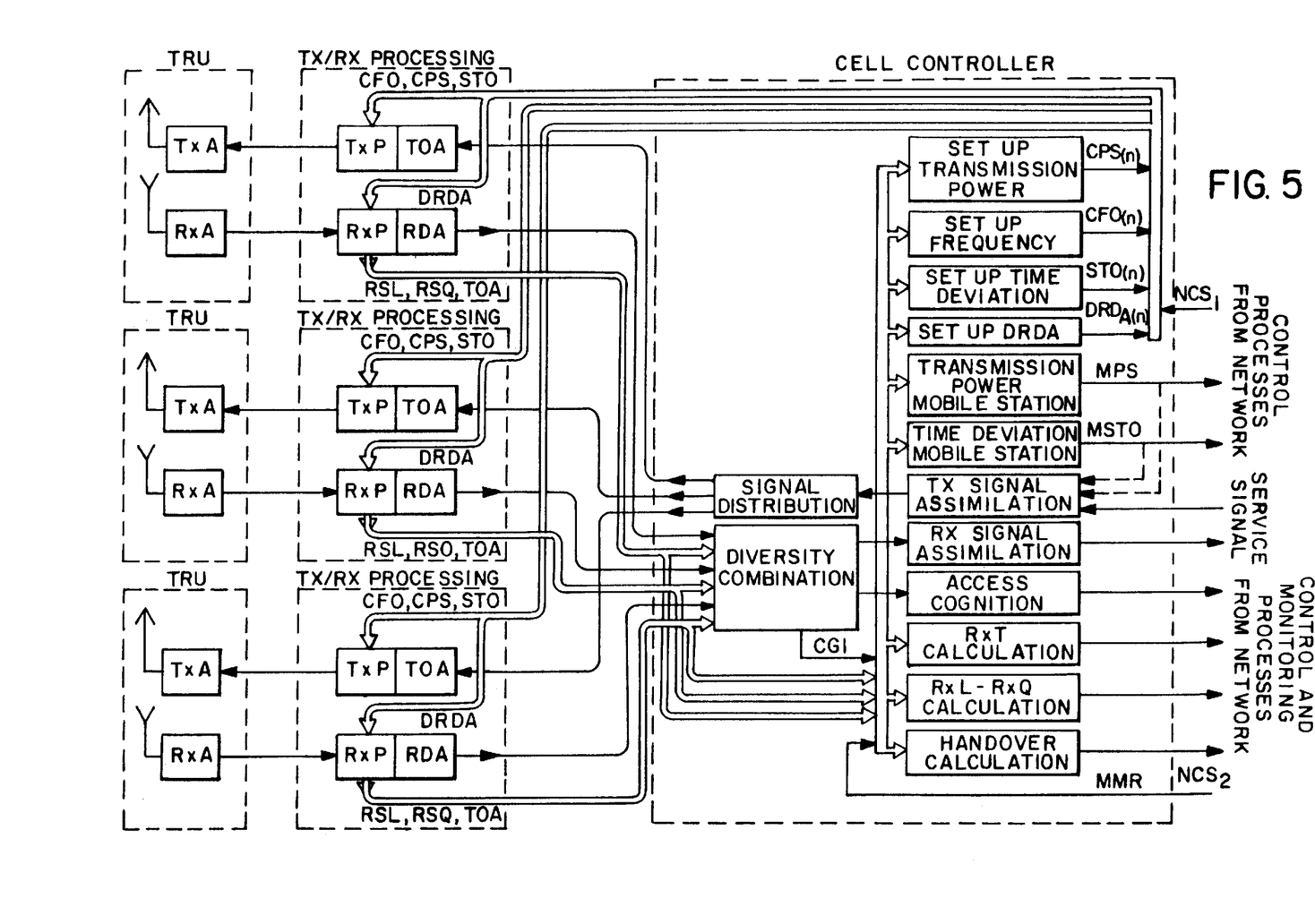
FIG. 5 shows a detailed presentation of the function blocks used in the whole system using three base stations per cell as an example.

The survey block diagram in FIG. 4 illustrates the structure and the equipment of the invention. It is seen that the whole system presented using three base stations per cell as an example consists of a total of three transmitter/receiver units TRU, three transmitter/receiver signal processing units (Block Tx/Rx Processing) and a cell controller CC. This diagram is the same for the different embodiments mentioned in the following. FIG. 5 gives more detailed information on the function blocks used within the whole system. Here the various abbreviations have the following meanings:

| | |
|---|---|
| CC | Cell Controller |
| CFO | Carrier Frequency Offset |
| CGI | Combiner-Generated Information |
| CPS | Channel Power Setting |
| DRDA | Dynamic Receive Delay Adjustment |
| MMR | Mobile station Measurement Report |
| MPS | Mobile station Power Setting |
| NCS | Network Control Signals |
| RDA | Receive Delay Adjustment |
| RSL | Receive Signal Level |
| RSQ | Receive Signal Quality |
| RxA | Receiver Amplifier (Receiver Amplifier/Mixer) |
| RxL | Receive Level (modified receive level, not identical to RSL) |
| RxP | Receiver Processing (Receiver signal processing) |
| RxQ | Receive Quality (modified receive quality, not identical to RSQ) |
| RxT | Receive Timing (modified time of received signal, not identical to TOA) |
| STO | Signal Timing Offset (Signal Timing Offset Base Station) |
| TDA | Transmit Delay Adjustment |
| TOA | Time of Arrival |
| TRU | Transmit Receive Unit |
| TxA | Transmitter Amplifier (Transmitter Amplifier/Mixer) |
| TxP | Transmitter Processing |
| Tx/Rx | Transmit/Receive Signal Processing |

An important feature of the solution according to the invention is that the transmitters and receivers installed in the base stations can be kept very simple. No distinction is then made between the various TRUs including the Tx/Rx Processing Units jointly supplying a cell. This means that the interface between the cell controller CC and the various Tx/Rx processing units is identical independent of whether, for example, a Tx/Rx processing unit is located at the location of the CC or at a base station at a different location. From this it can be concluded that the CC does not necessarily have to be located at a base station, but can also be installed at another suitable location, for example, at the next higher unit BSC in the hierarchy provided according to the GSM.

Various possible embodiments of the invention differ in the nature of the distribution of the functions between TRUs, Tx/Rx processing units and the CC. This determines the various signals to be transmitted on the interfaces between the CC and the Tx/Rx processing units or between the Tx/Rx processing units and the TRUs.

In a first embodiment the Tx/Rx processing block is installed at the location of the base station. At the interface between the CC and the Tx/Rx processing units, the useful signals are available in a still-to-be-coded form, not interleaved and not keyed. This means that in the base stations the channel coding, bit and block interleaving, coding as well as modulation (Tx processing) and power amplification (TxA) function are carried out in the transmitter path. The receiver in the base station contains the corresponding inverse functions such as receiver input stages, IF mixer and amplifier (RxA) as well as the equalization, demodulation, removal of interleaving and decoding and channel decoding (Rx-Processing).

In a second embodiment the Tx/Rx processing block is located at the location of the cell controller CC. At the interface between the Tx/Rx processing unit and the TRU the signals are transmitted in modulated form, for example, as IF signals over a directional radio link. In this case the modulation/demodulation and the equalization are located at the location of the CC. This embodiment opens, for example, the possibility for carrying out the receiver equalization combined for the various partial signals of the TRU of a cell and their combination in an aggregate signal in the Diversity Combination function block.

In a third embodiment the Tx/Rx processing block is in part installed at the location of the base station and in part at the location of the CC. At the interface between the CC and the Tx/Rx processing units, the useful signals are transmitted in digital form as bits as they also occur in the bursts defined at the radio interface. It thus involves coded, interleaved and keyed bits.

Consequently the coding, interleaving and encryption functions are carried out in the transmitter branch, and the corresponding inverse functions are carried out in the receiver branch at the location of the CC. These functions can then be carried out either separately for each of the connected base stations as part of the Tx/Rx processing or for all connected base stations together in the function blocks for Tx or Rx signal adjustment on the network side. Besides the functions of the TRU, the base stations consequently contain the remaining parts of the Tx/Rx processing, namely the modulator in the transmitter branch as well as demodulation and equalization in the receiver branch.

Furthermore, mixed forms of this embodiment are also possible where in one transmission direction, for example, the first form is used and in the opposite direction, for example, the second form us used or only a part of the cited functions is carried out in the Tx/Rx processing units.

For the optimized calculation of the various parameters of a cell with multiple communication in the cell controller the most reliable data on the transmission conditions must be used. Depending on the design of the base station and the mobile station, this may include:

Measurement of the received levels

Measurement of the received quality

Result of the correlation with training sequences

Distance measures in the equalization

Decoding results (for example, recognized or corrected errors)

Transmission time measurements

These measurements must be carried out both by the mobile station and by all base stations involved. Depending on the implementation, all specified values, some of them or similar data can be determined. According to FIG. 5, the above cited data can be found again in the quantities RSL, RSQ, TOA, MMR and CGI.

The cell controller has the task of, on the basis of the available data, calculating the optimal parameters for controlling the connection and for a suitable representation for the higher levels. It furthermore performs the useful signal combination in the uplink. The individual functions and their meaning will be described in more detail in the following.

In the following the functions of the cell controller for calculating the various cell parameters will be described in particular cases.

1 Transmit Delay Adjustment TDA

Receive Delay Adjustment RDA

The process according to DE-OS 41 41 398 A1 makes use of the fact that a mobile station is supplied from several fixed transmitters with the same transmitted signal. When a timecritical access process such as, for example, TDMA (Time Division Multiple Access) is used, it is necessary to make sure that the superimpositioning of these signals does not lead to harmful intersymbol interference or that suitable equalization equipment is available in the mobile station, as provided at GSM. In each case the signals must reach the mobile station essentially at the same time within a certain time tolerance because otherwise there is no improvement due to the adaptive equalization, and under certain circumstances there may even be a deterioration in the transmission quality. Consequently a fixed transmission time equalization TDA is adjusted for each connection path between the cell controller and the base stations, which carries out the adjustment of the various transmission times of the downlink signal between the cell controller and the base stations in such a way that the transmitter equipment (TxA) works in the simultaneous broadcasting mode.

In the uplink the cell controller also has the received signals from all the base stations available at the same time in order to ensure optimal further processing. This likewise requires a fixed transmission time equalization RDA in order to compensate for the different transmission times between the base stations and the cell controller.

The TDA and RDA function blocks can be located either in the cell controller or in the base stations. Mixed forms are also possible, in which the TDA is installed in the cell controller and the RDA is installed in the base stations or even the other way around.

If the cell radia are small, the delay blocks may under certain circumstances be dispensed with.

2 Signal Timing Offset STO in the base station

Dynamic Receive Delay Adjustment DRDA

Both of these function blocks and the control signals generated by them are used to further improve the transmission conditions in both directions and can optionally also be provided independently of each other.

As already mentioned in connection with FIG. 2, the downlink and uplink signals over their BS-MS or MS-BS path experience different delays as a function of position of the mobile station MS within the cell. In order to raise the transmission quality further, a dynamic compensation for these different transmission paths is carried out. By means of this measure, the occurring self-interference (intersymbol interference) is minimized. For this purpose the respective transmission times for each connection path between a base station and the mobile station must be determined and equalized. In the downlink the transmission time of the respective base station is for this purpose adjusted by means of the STO. In the uplink the received signals from the individual base stations are subjected to a different amount of delay by means of the DRDA. In systems with an equalizer the individual time positions can furthermore be adjusted in such a way that the signals are received at different defined points in time within the equalization window, and consequently maximum gain is achieved in the equalizer due to time diversity.

For the correct calculation of STO and DRDA, the cell controller takes advantage of the RSL, RSQ, TOA, MMR and CGI data.

The respective transmission time equalization can be carried out either in the Tx/Rx processing unit or inside the 'signal distribution' or 'diversity combination' blocks.

3 Base station Channel Power Setting CPS

This function block and the control signal generated by it is used for regulating the transmitter power of the base stations and is provided as an option.

For optimal transmission quality the minimal signal/ interference disturbance separation prevailing in the channel must be as high as possible in the whole system.

It is therefore advantageous to adjust, as a function of the position of the mobile station, the transmitter power levels of the base stations feeding them in the downlink dynamically in such a way that the minimal signal/interference disturbance separations are maximized. The optimal power assignment is determined in the cell controller from the various input quantities cited above such as, for example, RSL, RSQ, TOA, MMR, and CGI as well as any network information, see FIG. 5. Both the total transmitted power of the base stations of a cell as well as the proportionate distribution of this total power over the individual base stations or both can be controlled here.

4. Mobile station Power Setting MPS

What has been said in the previous point applies here analogously. The mobile station power setting unit MPS is arranged to dynamically adjust the transmitted power of a mobile station based on propagation conditions and position of signals from the base station to the mobile station. The optimal power regulation is likewise determined in the cell controller from the various input quantities cited above RSL, RSQ, TOA, MMR, and CGI. Three variants are possible for integrating the MPS control information into the useful signal. For one thing, the MPS signal can take place inside the Tx signal matching block (shown in dashed lines in FIG. 5). For another thing, it is possible to pass the MPS signal on to the higher order network, which then carries out the integration into the useful signal. As a third possibility, the higher order network can reconstruct the MPS signal, for example, from the RxL and RxQ values and insert it in the useful signal so that then the "Mobile station transmitter power" block shown in FIG. 5 can be dispensed with.

5 Carrier Frequency Offset CFO

This function block and consequently the control signal generated by it are also provided as an option.

For the optimization of the radio communication it is conceivable to select the carrier frequencies of the individual base stations so that they differ by a certain small amount. This small difference can be adjusted by means of the CFO. The purpose of this is to compensate for fading breakins of the receiving level for non-moving participants. By means of slightly different carrier frequencies, a time-constant fading breakin is avoided at all places inside the cell surface with significant multiple communication.

6 Mobile station Signal Timing Offset MSTO

The point in time of the transmission of the mobile station is generally controlled from the base side. Since now several base stations are connected with a mobile station, the optimal point in time for the transmission must be calculated in the cell controller and sent uniformly from each base station to the mobile station. Depending on the implementation, the various measured values RSL, RSQ, TOA, MMR and CGI are used as input values for calculating the optimal MSTO point in time for the transmission.

Three variants are possible for integrating the MSTO control information in the useful signal, similar to what was shown in paragraph 4 for the MPS signal. Here it is also possible to integrate the signal within the Tx signal matching block as well as to pass it on to the higher order network, which then carries out the insertion in the useful signal. As a third possibility, the MSTO signal can here be reconstructed by the higher order network, for example, from the RxT value, and inserted in the useful signal so that then the "Mobile station Time Offset" block shown in FIG. 5 can be dispensed with.

7 Signal Distribution

The signals sent out on each carrier within a cell by the various base stations of the cell must be identical in the base band. The signal distribution block takes care of the correct distribution and assignment of the signals to the respective base stations.

8 Tx/Rx Signal Matching

Depending on the implementation of the signal distribution or the diversity combination (see below), it may be necessary to convert or to adapt the corresponding signals for further processing in their next higher order unit. For example, in one embodiment it may be necessary to carry out the channel decoding in the receiving branch after the diversity combination. The 'Rx-Signal Assimilation' function unit is used for this purpose. The 'Tx-Signal Assimilation' function unit could consequently carry out the channel coding in the transmitter branch.

9 Access Recognitionn

In the case of simultaneous first access by several mobile stations, under certain circumstances several accesses may correctly be recognized when they are essentially received by different base stations in the cell. Here it can be provided that only one of these accesses is selected and passed on for the assignment of a desired channel.

As an alternative a variant is proposed in which all accesses recognized to be correct are serviced one after the other.

10 RxT-, RxL-, RxQ-Calculation

For regulation and monitoring processes on the network side it may be necessary to transfer certain characteristic quantities of the radio transmission to the hierarchically higher-lying units. Thus in the GSM system the BSC has available data on the received level (RXLEV) and received quality (RXQUAL), for example, for possible handover decisions. The quantities here generally referred to as RxT, RxL, and RxQ are the transmitted resulting values for the time position of the mobile station (RxT), the received level of the base stations (RxL) as well as the received quality of the base stations corresponding to control and monitoring processes on the network side. They do not have to agree with the quantities RSL, RSQ and TOA used internally in the overall system (see FIG. 5). CGI information (Combiner-Generated Information) generated in the 'Diversity Combination' block can also be used to calculate the corresponding RxT, RxL and RxQ values.

11 Handover Calculation

Besides the multiple communication of a cell through several base stations, the radio net architecture mentioned in DE-OS 41 41 398.9 exhibits a defined overlapping of the cells in certain areas. This has the advantage that in contrast to conventional radio net architectures a handover can be initiated in the area of higher signal/interference disturbance separations. This ensures a quality-neutral, reliable handover. Because of the changed signal/interference disturbance separations or the changed power level of adjacent carrier frequencies in the handover range, conventional handover algorithms, which are essentially based on level measurements of adjacent carriers by the mobile station, are not optimally suitable.

In the radio net architecture with multiple communication, more consideration must be given to the data in the uplink because an improved position determination of the mobile station is possible due to the reception at different sites far apart in space. For example, the following equations represent the extreme cell limitations including a hysteresis range.

Here $e_{ij}=e_{ji}$ gives the distance between $BS_i$ and $BS_j$, and $d_i$ gives the distance measured from $BS_i$ to the mobile station.

Two procedures are proposed for transmitting information pertaining to the handover from the cell controller to the next higher-order unit.

For one thing it is possible to map all the data in the uplink and downlink on an equivalent record of values, which in case of a single feed for the cell would occur for the same position of the mobile station. If the cell controller carries out this mapping and delivers the mapped data record to the higher level unit, then no changes are necessary there with respect to the handover algorithm.

As an alternative, additional data, which result from the greater number and independence of the data from the fixed and mobile station, can be tranferred to the higher level unit. For example, a reliability value, which may influence the urgency of the handing over decision, is possible here.

12 Diversity Combination in the Uplink

The signal transmitted by the mobile station is usually received well by several base stations of a cell. Because of the good decorrelation (separation in space, different incident angles), in the uplink a greater diversity gain can be achieved, which supports especially mobile stations with low transmitted power. As already mentioned at the beginning in the presentation of the various embodiments, this diversity process can be carried out in different ways.

One possibility is to select in the cell controller and forward only the best received signal of a base station of the cell determined on the basis of a quality criterion (selection combining). The selection can basically be carried out on the IF level, the bit level, the burst level or the report level or per speach frame. The quality criterion can be derived from one or more of the RSL, RSQ, TOA, MMR and CGI measured values in the downlink and uplink or similar values.

Refined procedures with a linear or nonlinear combination of the signals received from the base stations of a cell on the cited levels and with the weights derived from the cited criteria are possible. If necessary, the differences in the propagation times between the mobile station and the base stations as well as between the base stations and the cell controller must then be compensated for to ensure a correct phase combination of the signals (see paragraphs 1 and 2).

13 Measurement Information from the Mobile station MMR

The MMR measurement information from the mobile station is generally available in coded form in the uplink useful signal. The MMR signal can thus for one thing be extracted in the Rx signal matching or extracted from the network as shown on FIG. 5 and sent back to the cell controller CC.

14 NCS Network Control Signals

The network usually delivers to the cell controller CC various information for controlling the corresponding functions. The power control of the base station(s) or the mobile station, the frequency sequences in frequency hopping or the key and additional relevant information in the use of a keying algorithm on the radio interface are here cited as examples. The control signals can be transmitted directly to the Rx/Tx processing units (shown in FIG. 5 with $NCS_1$) or used as additional input variables for the various processes of the cell controller similar to the MMR signals (shown in FIG. 5 with $NCS_2$. Depending on the nature of the respective control signal and the implementation variant, a signal control according to the first or the second variant or according to both variants simultaneously becomes available.

15 Optimization of the Connection Paths

In the new net architecture it is possible to tie several cell controllers for several cells with a favorable placement with the smallest possible expense for the fixed lines to hierarchically higher units. This is shown in the following using the already presented example of the multiple feed of a cell with three base stations.

The cell controller shown in FIG. 3 is advantageously located at one of the three base stations feeding a cell (here it makes no difference where the Rx/Tx processing units are located). This base station will in the following be designated the master BS regardless of whether its implementation is complex or less complex; the two other BS belonging to a cell will be designated slave BSs. The consequences of using the new radio net architecture are as follows:

Only the master BS or the cell controller is connected through a conventional interface to the hierarchically higher unit. This interface corresponds to the interface which is also present in a conventional architecture between each base station and the higher unit.

Figure 6:
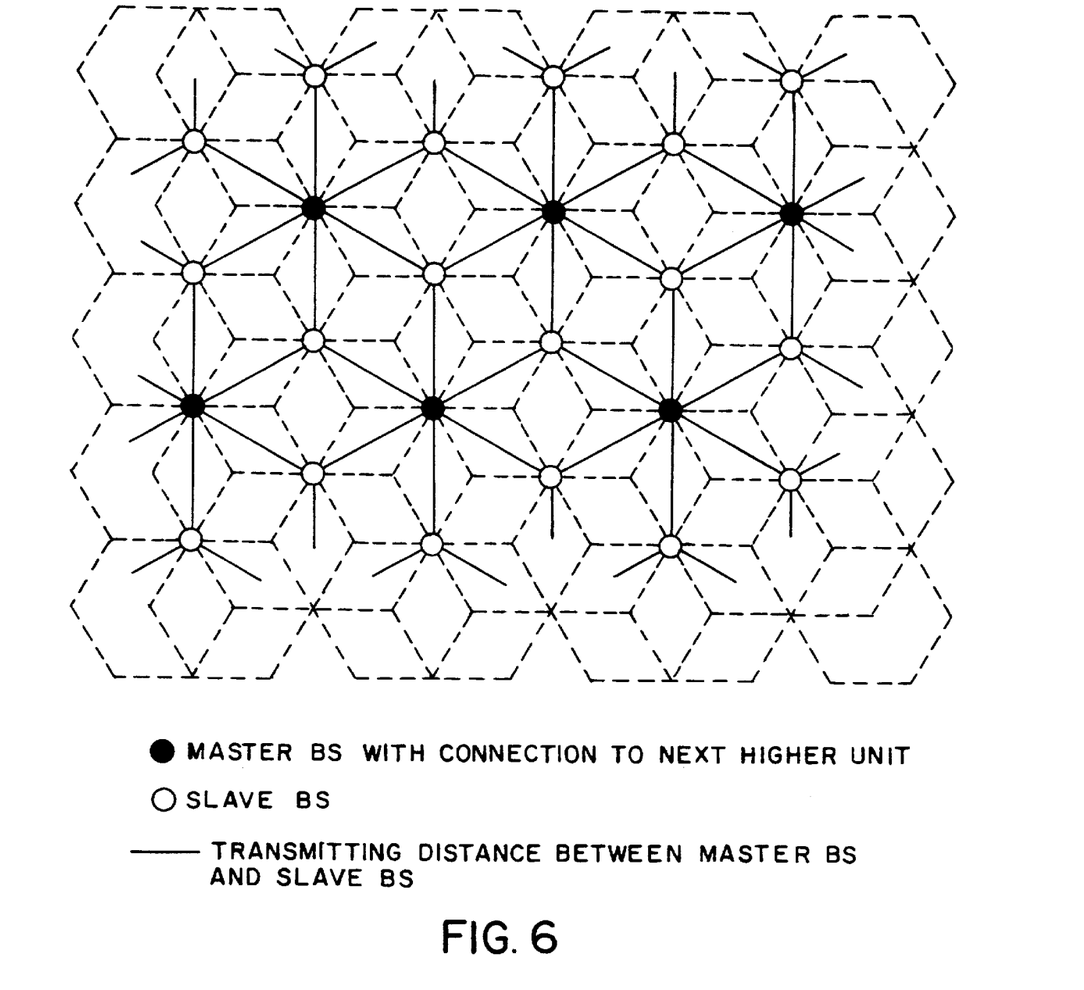
FIG. 6 shows the preferred placement of the master base stations and their connection to the slave base stations.

The slave BSs are connected to the master BS or the cell controller through an additional interface. As compared to a conventional architecture without multiple feed, the connection present there to a higher unit is replaced by a connection to the master BS. Because additional connection paths are required between the master and the slave BS, the result of this is that the number of (master) BS connected with the higher-lying unit drops to one third with a skilful arrangement in space. FIG. 6 makes this clear. However, this results in a reduced capacity requirement on the interface between the master BS and the higher-lying unit. But a bundle gain is achieved.

This optimization with respect to the bundle gain is also possible for conventional radio net architectures with a simple feed.

We claim:

1. A cell control system for a cellular digital mobile communication system, comprising:

a plurality of cells, each cell having a plurality of base stations, each cell being fed from the edge of the cell by said base stations in simultaneous broadcasting with the same signal through directional antennae, wherein the signals transmitted in the base band on the carrier of each base station are identical;

a plurality of cell controllers, each cell controller being associated with the base stations of at least one cell;

each cell controller comprising a signal distribution unit for assigning and distributing signals from a base station controller to the base stations of the respective cell in a downlink, and a central diversity combination unit for combination of signals from the respective base stations into an aggregate signal in an uplink;

whereby the cell controller contains means for signal processing of signals to and from the base stations and to and from hierarchically higher network units and means for control of radio equipment in the base stations; and the cell controller including adjustment means for dynamically adjusting the transmitted power of each base station assigned to it as well as the total power radiated in the cell depending on the received level and the position of a mobile station.

2. The system as claimed in claim 1, wherein the diversity combination unit comprises means for selecting and forwarding only the best received signal of each base station determined on the basis of a quality criterion.

3. The system as claimed in claim 1, wherein the diversity combination unit comprises means for carrying out linear or non-linear weighting and combination of the signals received from the base stations of a cell, and means for forwarding said signals.

4. The system as claimed in claim 1, wherein the diversity combination unit comprises means for equalizing the various partial signals of a cell on the receiver side and combining the partial signals into an aggregate signal.

5. The system as claimed in claim 1, wherein each base station has a transmit/receive unit, the system further including a respective transmit/receive signal processing unit connected between each transmit/receive unit and the cell controller.

6. The system as claimed in claim 5, wherein each transmit/receive signal processing unit is located at the respective base station.

7. The system as claimed in claim 5, wherein each transmit/receive signal unit is located at the cell controller.

8. The system as claimed in claim 5, wherein each transmit/receive signal unit includes individual function blocks, a first portion of said function blocks being located at the respective base station and a second portion of said function blocks being located at said cell controller.

9. The system as claimed in claim 5, wherein the cell controller includes means for transmitting control signals of a hierarchically higher unit directly to the receive/transmit processing units.

10. The system as claimed in claim 1, including equipment for fixed transmitted signal delay and received signal delay located between each cell controller and the associated base stations, the equipment comprising means for balancing out the transmission times for signals between the cell controller and associated base stations.

11. The system as claimed in claim 1, wherein each base station has a transmitter and receiver branch, the transmitter and receiver branch including a delay unit for dynamically delaying the transmitted signal and the received signal, whereby the mutual time offset of the individual signals has been adjusted for minimum self-interference.

12. The system as claimed in claim 1, wherein each base station has a transmitter and receiver branch, the transmitter and receiver branch including a delay unit for dynamically delaying the transmitted signal and the received signal, whereby the mutual time offset of the individual signals has been adjusted for maximum equalization gain.

13. The system as claimed in claims 1, wherein each base station has a transmitter and receiver branch, the transmitter and receiver branch including a delay unit for dynamically delaying the transmitted signal and the received signal, whereby the mutual time offset of the individual signals has been adjusted for favorable compromise between minimum self-interference and maximum equalization gain.

14. The system as claimed in claim 1, wherein the cell controller includes adjustment means for dynamically adjusting the transmitted power of a mobile station based on propagation conditions and position of signals from the base station to the mobile station.

15. The system as claimed in claim 1, wherein the cell controller provides a carrier frequency offset, whereby the carrier frequencies of the base stations of a cell feeding a mobile station differ by a predetermined amount.

16. The system as claimed in claim 1, wherein the cell controller provides signal matching of corresponding signals, and comprises means for transmitting said signals to a hierarchically next higher unit for further processing and for transmitting signals back from said higher unit.

17. The system as claimed in claim 1, including means for servicing correctly recognized accesses one after the other in succession in the event of simultaneous first access by a plurality of mobile stations.

18. The system as claimed in claim 1, including servicing means for selecting and servicing one of a plurality of correctly recognized accesses in the event of simultaneous first access by a plurality of mobile stations.

19. The system as claimed in claim 1, wherein the cell controller includes a processing unit for calculating characteristic quantities of a radio transmission and transmitting said characteristic quantities to a hierarchically higher unit.

20. The system as claimed in claim 1, wherein the cell controller includes handover means for calculating handover, the handover means including means for mapping data available in the cell controller on an equivalent data record serving as a basis for prior handover calculations.

21. The system as claimed in claim 1, wherein the cell controller includes handover means for transmitting data to a higher order unit for influencing the handover decision.

22. A cell control system for a cellular digital mobile communication system, comprising:

a plurality of cells, each cell having a plurality of base stations, each cell being fed from the edge of the cell by said base stations in simultaneous broadcasting with the same signal through directional antennae, wherein the signals transmitted in the base band on the carrier of each base station are identical;

a plurality of cell controllers, each cell controller being associated with the base stations of at least one cell;

each cell controller comprising a signal distribution unit for assigning and distributing signals from a base station controller to the base stations of the respective cell in a downlink, and a central diversity combination unit for combination of signals from the respective base stations into an aggregate signal in an uplink;

whereby the cell controller contains means for signal processing of signals to and from the base stations and to and from hierarchically higher network units and means for control of radio equipment in the base stations; and means for extracting measurement information of the mobile station from an uplink useful signal during received signal matching.

23. The system as claimed in claim 1, including means for receiving measurement information of a mobile station extracted in a hierarchically higher unit and sent back to said cell controller.

24. The system as claimed in claim 1, wherein the cell controller includes means for receiving control signals of a hierarchically higher unit and for using said control signals as additional input quantities for cell controller processes.

25. The system as claimed in claim 1, wherein cell controllers for at least one cell are located in a first base station of the cell, the first base station comprising a master base station, and the other base stations of the cell comprising slave base stations.

26. The system as claimed in claim 25, wherein the cell controllers for a set of cells are located in a master base station of one of the cells, and the other base stations of said one cell and all the base stations of the other cells in said set comprise slave base stations, whereby only a fraction of the cells in said system contain master base stations.

27. The system as claimed in claim 26, wherein only the master base station is connected through the cell controller and an interface to a hierarchically higher unit.

28. The system as claimed in claim 26, including an additional interface connecting each slave base station to the cell controller in the master base station.

29. A cell control system for a cellular digital mobile communication system, comprising:

a plurality of cells, each cell having plurality of base stations, each cell being fed from the edge of the cell by said base stations in simultaneous broadcasting with the same signal through directional antennae, wherein the signals transmitted in the base band on the carrier of each base station are identical;

a plurality of cell controllers, each cell controller being associated with the base stations of at least one cell;

each cell controller comprising a signal distribution unit for assigning and distributing siqnals from a base station controller to the base stations of the respective cell in a downlink, and a central diversity combination unit for combination of signals from the respective base stations into an aggregate signal in an unlink;

whereby the cell controller contains means for signal processing of signals to and from the base stations and to and from hierarchically higher network units and means for control of radio equipment in the base stations; and the cell controller including means for calculating the point in time for transmitting by a mobile station, and for transmitting said point in time by each base station uniformly to said mobile station.

30. A method of downlink and uplink communication to and from base stations of a plurality of cells in a cellular communication system, comprising the steps of:

providing a plurality of cells, each cell having a plurality of base stations;

providing a plurality of cell controllers, each cell controller being associated with the base stations of at least one cell;

assigning and distributing signals received by each cell controller from a base station controller to the base stations of the respective cell in a downlink direction;

combining signals received by a cell controller from the respective base stations into an aggregate signal in an uplink direction;

controlling radio equipment in the base stations from the cell controllers; and the cell controller dynamically adjusting the individual transmitted power of each base station assigned to it as well as the total power radiated in the cell depending on the received level and the position of a mobile station.

31. The method as claimed in claim 30, wherein the step of combining signals comprises selecting and forwardly only the best received signal of each base station determined on the basis of a quality criterion.

32. The method as claimed in claim 30, wherein the step of combining signals comprises carrying out linear or non-linear weighting and combination of the signals received from the base stations of a cell, and forwarding said signals.

33. The method as claimed in claim 30, wherein the step of combining signals comprises equalizing the various partial signals of a cell on the receiver side and combining the partial signals into an aggregate signal.

34. The method as claimed in claim 30, wherein the cell controller dynamically adjusts the transmitted power of a mobile station based on propagation conditions and position of signals from the base station to the mobile station.

35. The method as claimed in claim 30, wherein the cell controller calculates the point in time for transmitting by a mobile station, and the calculated point in time is transmitted by each base station uniformly to the mobile station.

* * * * *